United States Patent
Miyazaki et al.

(10) Patent No.: US 6,850,703 B2
(45) Date of Patent: Feb. 1, 2005

(54) POP-UP MECHANISM OF FLASHING APPARATUS AND CAMERA APPARATUS EQUIPPED WITH THE FLASHING APPARATUS

(75) Inventors: Yoshiya Miyazaki, Kanagawa (JP); Yoichi Miyajima, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/081,235

(22) Filed: Feb. 25, 2002

(65) Prior Publication Data

US 2002/0122666 A1 Sep. 5, 2002

(30) Foreign Application Priority Data

Feb. 26, 2001 (JP) .................................... P2001-050910

(51) Int. Cl.[7] .............................................. G03B 15/03
(52) U.S. Cl. ...................................... 396/177; 348/371
(58) Field of Search ................................ 396/177, 178; 348/370, 371

(56) References Cited

U.S. PATENT DOCUMENTS 4,407,573 A * 10/1983 Wakabayashi et al. ...... 396/165

* cited by examiner

Primary Examiner—David M. Gray
(74) Attorney, Agent, or Firm—Rader, Fishman & Grauer PLLC; Ronald P. Kananen

(57) ABSTRACT

A pop-up mechanism and a camera apparatus equipped with this pop-up mechanism that can be configured without using a motor or a gear train and manufactured at a low cost by reducing the number of parts and realizing compactness and light weightare disclosed. A pop-up mechanism and a camera apparatus equipped with this pop-up mechanism comprising a strobo apparatus (9) that is supported so as to be movable between a pop-up position and a housing position, a coil spring (29) urges the strobo apparatus (9) to the pop-up position, a working member (11) having a hooking piece (13) which holds the strobo apparatus (9) at the housing position, and a plunger mechanism (16) that is linked to said working member and of which the magnetic attracting force is inactivated when the plunger mechanism is energized.

10 Claims, 17 Drawing Sheets

POP-UP MECHANISM OF FLASHING APPARATUS AND CAMERA APPARATUS EQUIPPED WITH THE FLASHING APPARATUS

BACKGROUND OF THE INVENTION

1. Field of the invention

The present invention relates to a camera apparatus equipped with a pop-up mechanism for a flashing apparatus such as, for example, a strobo and the like, and a flashing apparatus. More specifically, the present invention makes it possible to reduce the number of parts of and make compact the flashing apparatus having the pop-up mechanism, thereby making it lighter and manufacturing it at a low cost.

2. Description of the Prior Art

In the prior art, there is a system in which a strobo apparatus mounted on a video camera apparatus automatically pops up by a button operation. An example of such type of a pop-up mechanism comprises an urging spring which allows the strobo apparatus to spring up to a pop-up position and an engaging lever which is movable by a motor, wherein the strobo apparatus is housed in a housing position resisting a spring force of the urging spring by engaging the strobo apparatus with this engaging lever. When the engaging lever is disengaged, the strobo apparatus is sprung up to the pop-up position by the spring force of the urging spring.

However, since the above-mentioned pop-up mechanism uses a system to move the engaging lever to engagement and disengagement positions utilizing a driving power of a motor, it is necessary to install a few stages of a gear train to transmit the driving power of the motor to the engaging lever. Thus, a large space for housing the gears is required, leading to difficulty in designing a compact video camera apparatus. In addition, a large number of parts for the pop-up mechanism causes a cost increase.

SUMMARY OF THE INVENTION

The object of the present invention is to solve the above-mentioned problems and to obtain a pop-up mechanism for a flashing apparatus and a camera apparatus equipped with the pop-up mechanism wherein the pop-up mechanism without a motor or a gear train can be realized, the number of parts can be reduced, a compact and light weight camera apparatus can be designed, and such apparatus can be manufactured at a low cost.

In order to achieve the above-mentioned object, the pop-up mechanism for the flashing apparatus according to the present invention comprises the flashing apparatus supported so as to be movable between a pop-up position and a housing position, a spring means which urges the flashing apparatus to the pop-up position, a working member having an engaging means to hold the flashing apparatus in the housing position, and a plunger that is linked with the working member and of which a magnetic attracting force is inactivated when the plunger is energized.

According to the above-mentioned pop-up mechanism, the working member is attracted by the magnetic attracting force generated in the plunger resisting the spring force of the spring means so that the flashing apparatus is held in the housing position by the engaging means. By energizing the plunger to inactivate the magnetic attracting force, the spring force of the spring means moves the engaging means backward to allow the flashing apparatus to be sprung up to the pop-up position.

In addition, the camera apparatus equipped with the pop-up mechanism for the flashing apparatus according to the invention comprises a photo button, a photometric means which detects brightness of a subject by a semi-pressing operation of the photo button, and a flashing apparatus that is designed to be sprung up to the pop-up position when the amount of light admitted to the subject detected by the photometric means is equal to or less than a set value.

In the above-mentioned camera apparatus, the brightness of the subject is detected by the photometric means interlocking with the semi-pressing operation of the photo button. For example, when the amount of light admitted to the subject is equal to or more than the set value, the flashing apparatus does not pop up, and is kept in a housed condition so that a photograph is taken normally. On the other hand, when the amount of light admitted to the brightness of the subject is less than the set value, the flashing apparatus is sprung up to the pop-up position so that a photograph is taken using flashing light.

DESCRIPTION OF THE PREFERRED EMBODIMENTS

Embodiments of a pop-up mechanism for a flashing apparatus and a camera apparatus equipped with this mechanism according to the invention are described, taking a video camera as an example, while referring to drawings.

Figure 1:
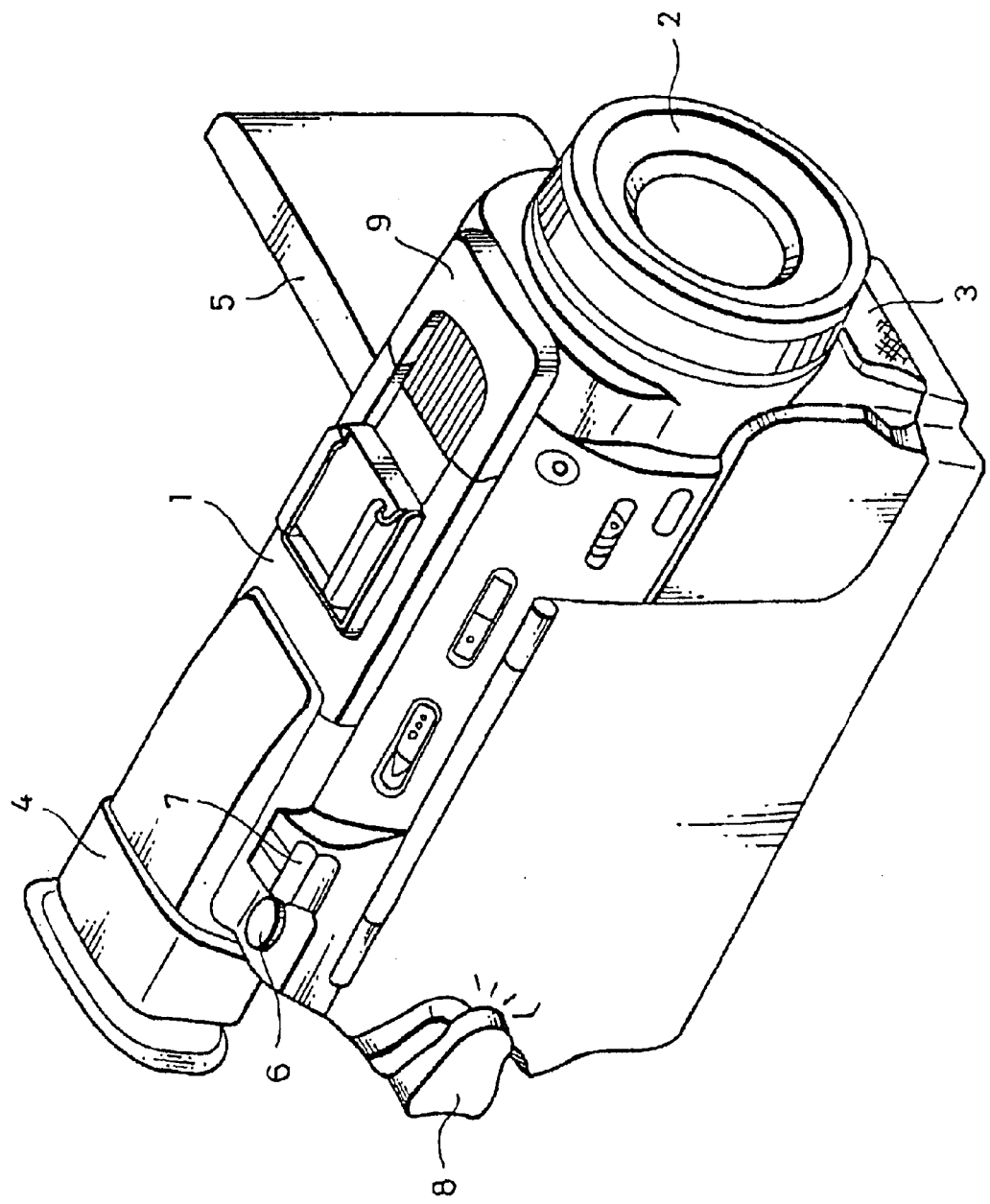
FIG. 1 is an outline perspective view of a video camera apparatus in a condition that a strobo apparatus is housed.
Figure 2:
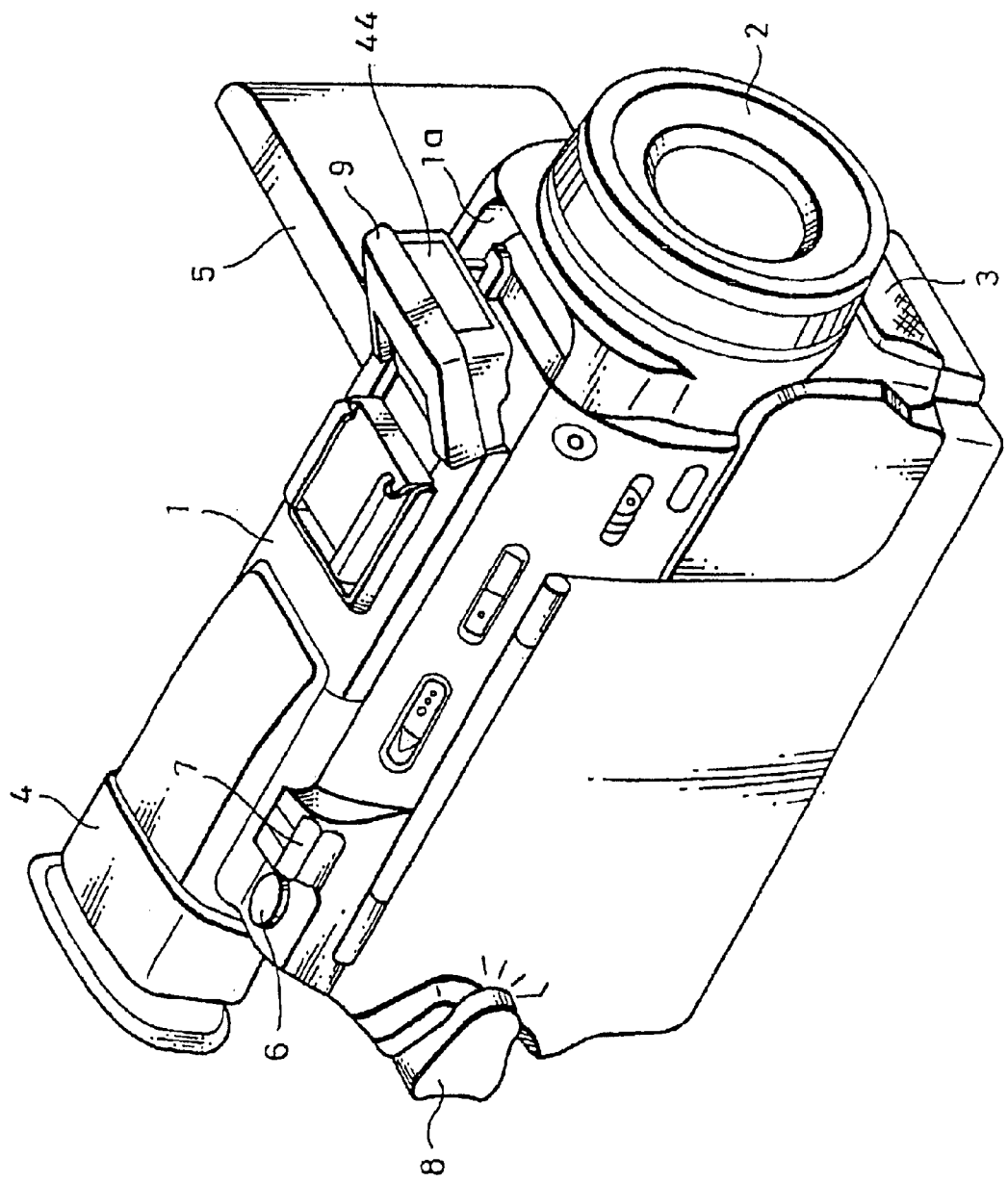
FIG. 2 is an outline perspective view of the video camera apparatus in a condition that the strobo apparatus is located in a pop-up position.
Figure 3:
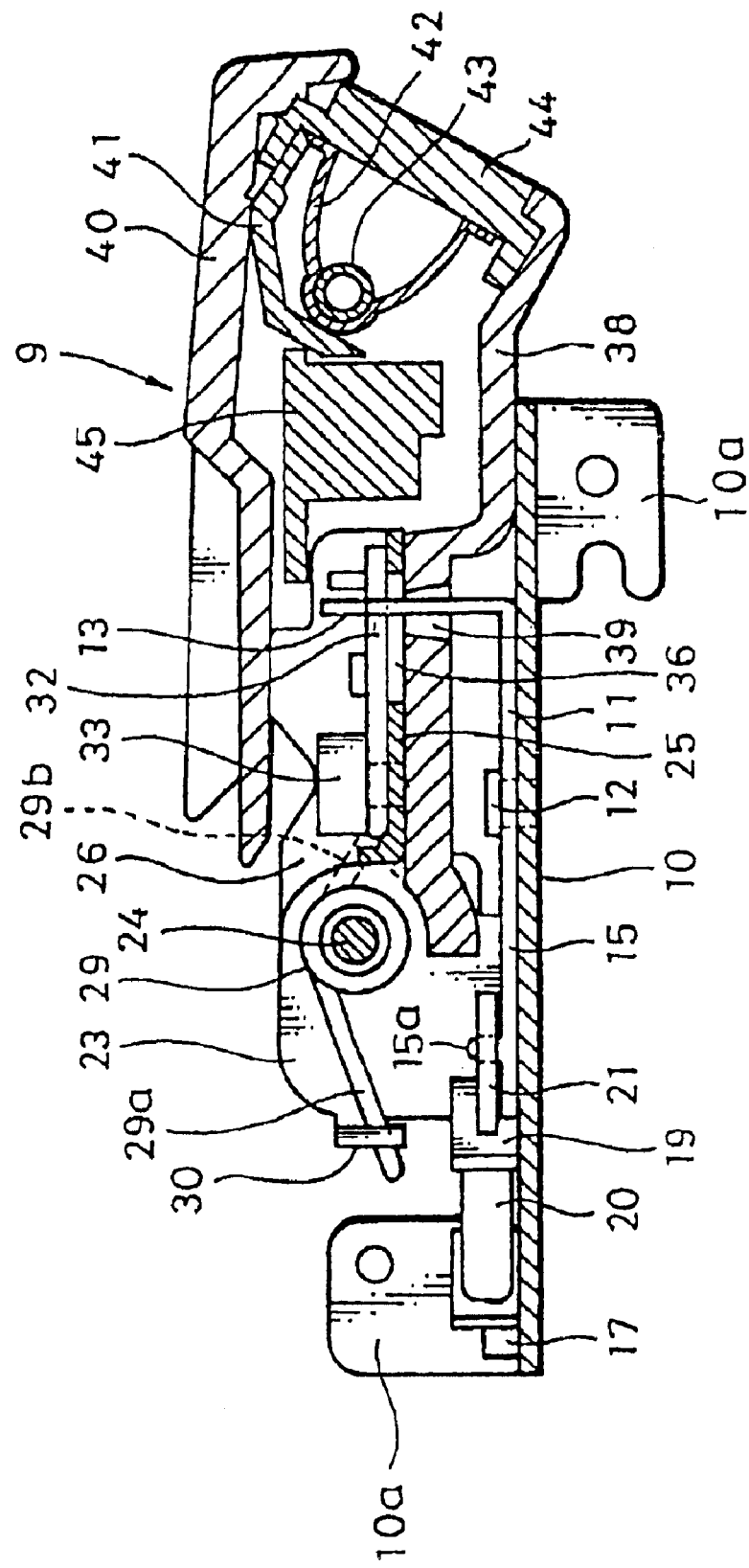
FIG. 3 is a cross sectional view of the strobo apparatus housed in the video camera apparatus.
Figure 4:
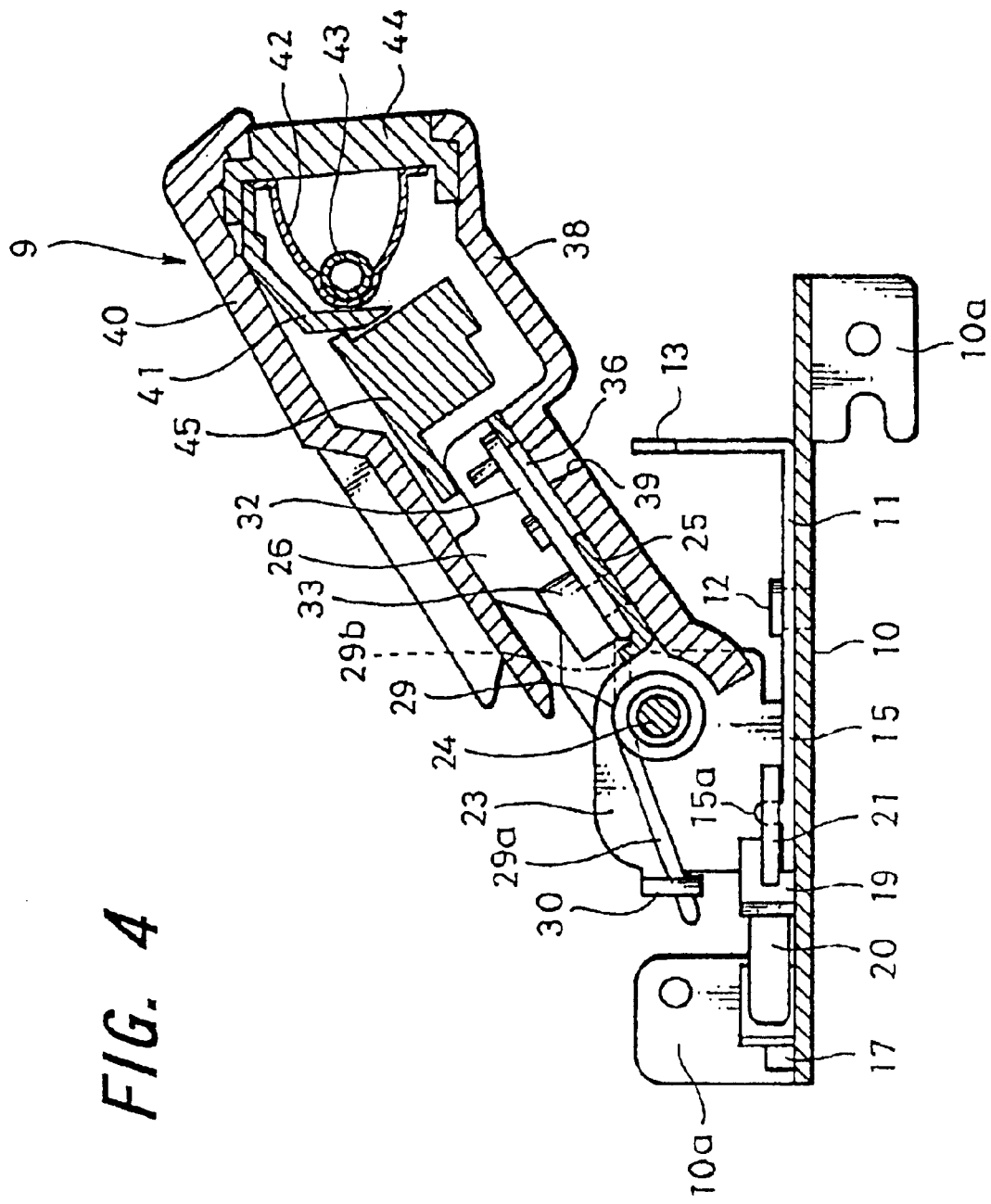
FIG. 4 is a cross sectional view of the strobo apparatus in a condition that it has popped up from the video camera apparatus.
Figure 5:
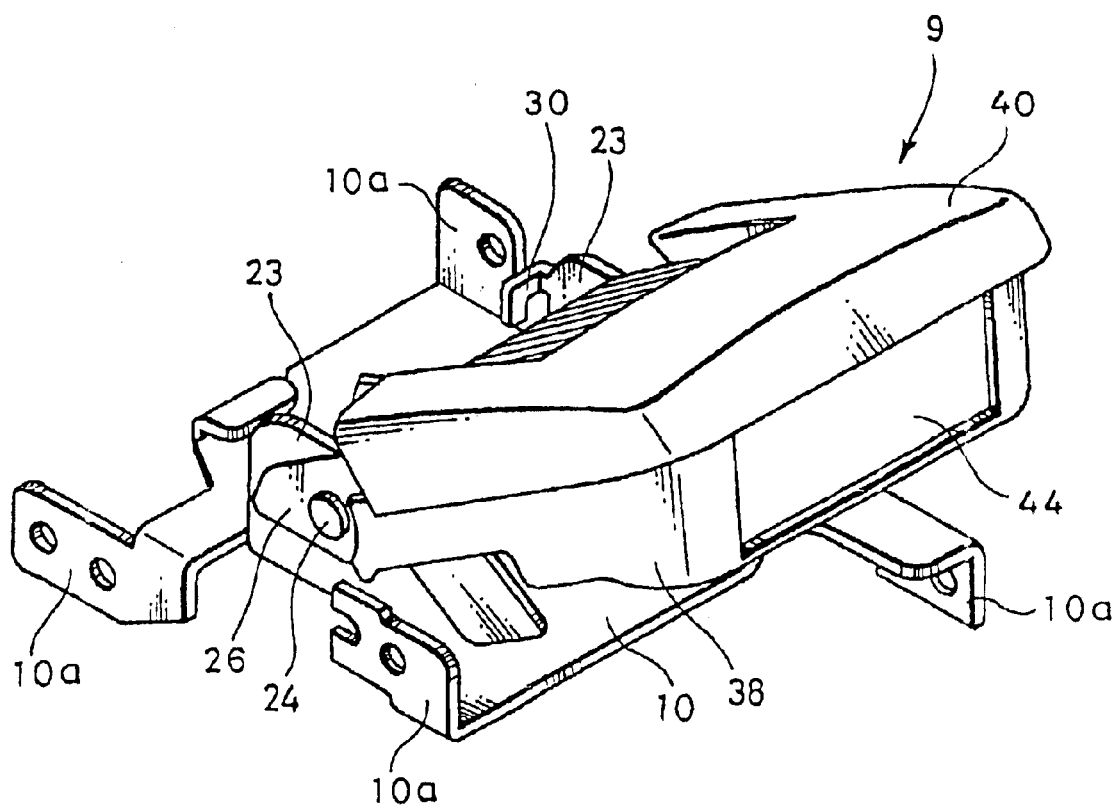
FIG. 5 is a perspective view of the strobo apparatus in the same condition that it has popped up from the video camera apparatus.
Figure 6:
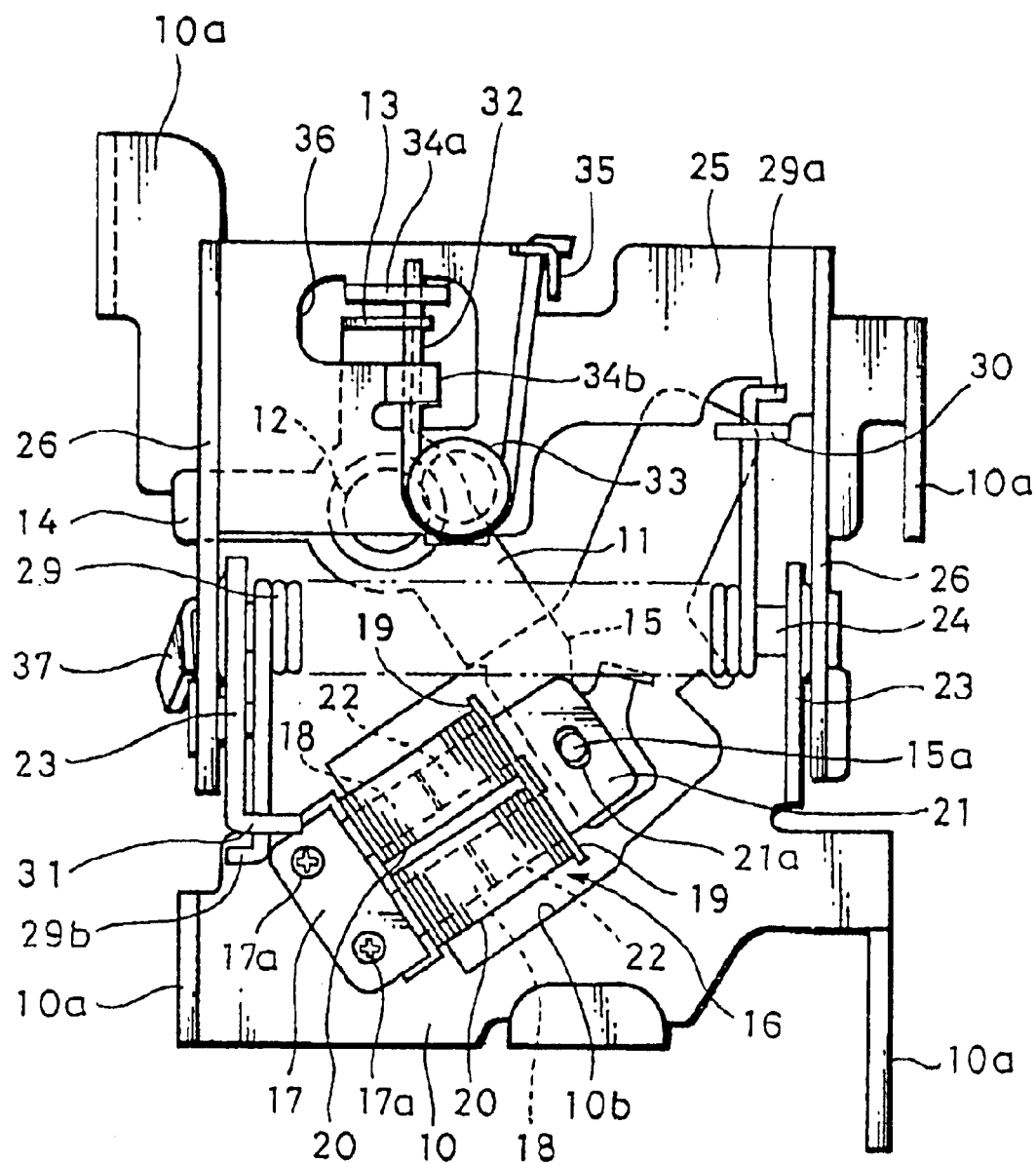
FIG. 6 is a plan view of the pop-up mechanism in a housed condition.
Figure 7:
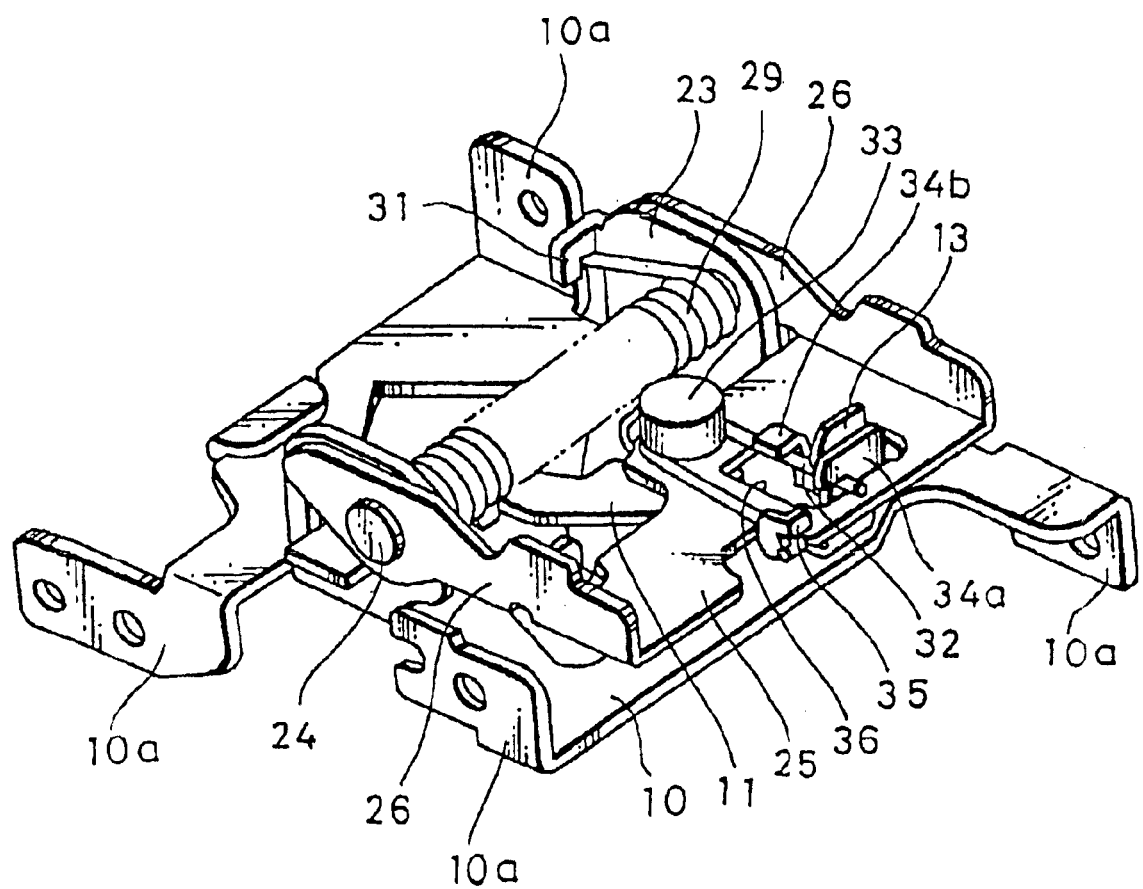
FIG. 7 is a perspective view of the pop-up mechanism in the same housed condition.
Figure 8:
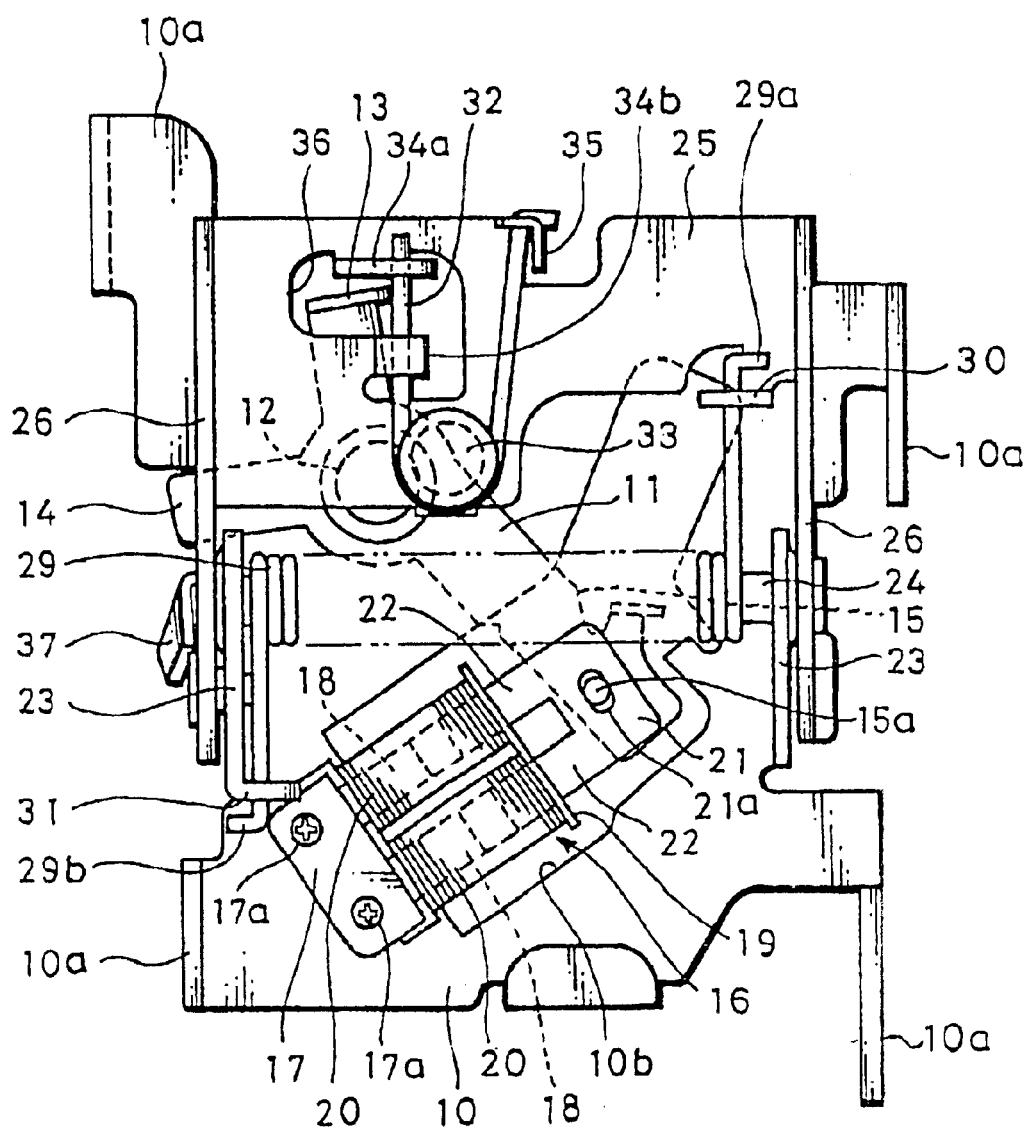
FIG. 8 is a plan view of the pop-up mechanism just before the pop-up.
Figure 9:
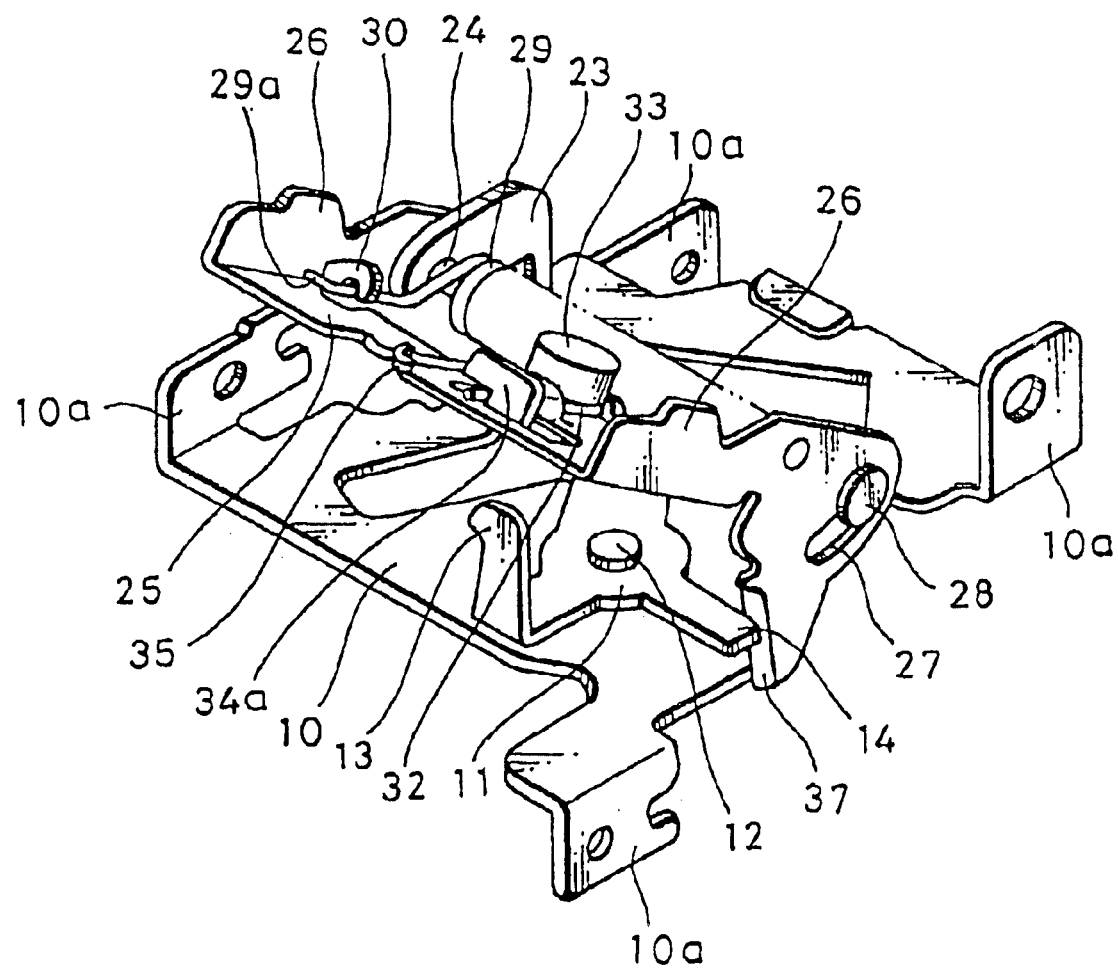
FIG. 9 is a perspective view of the pop-up mechanism in a popped up condition.
Figure 10:
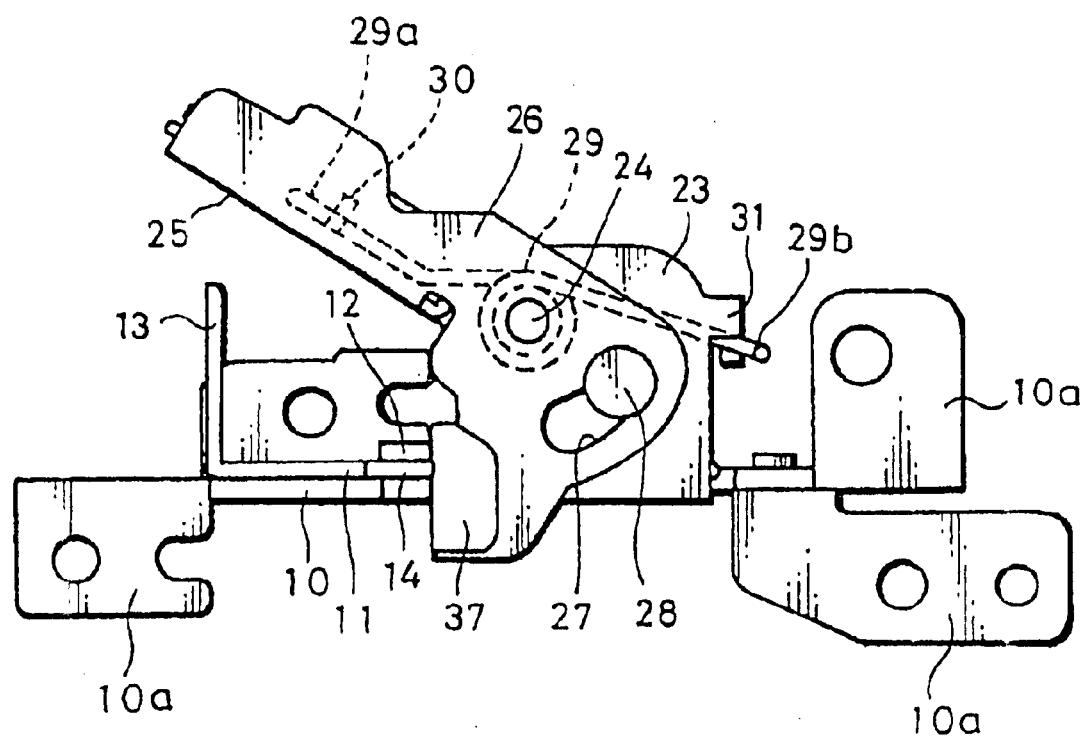
FIG. 10 is a side view of the pop-up mechanism in the same popped up condition.
Figure 11:
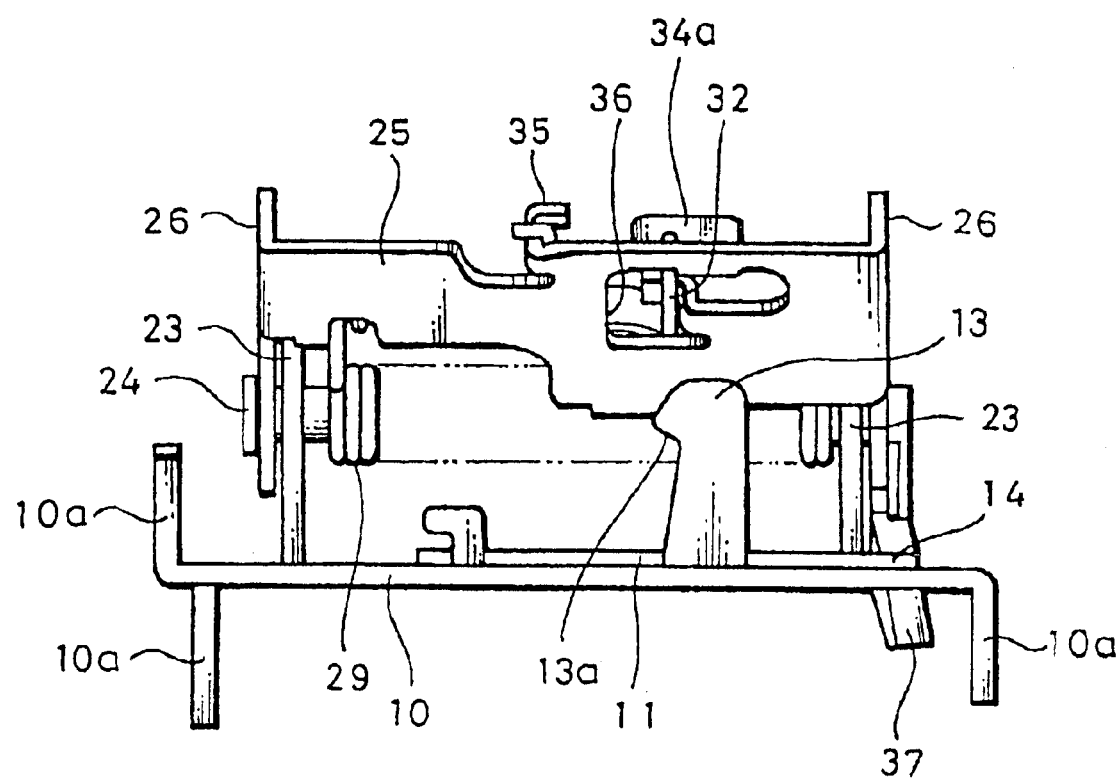
FIG. 11 is a front view of the pop-up mechanism in the same popped up condition.
Figure 12:
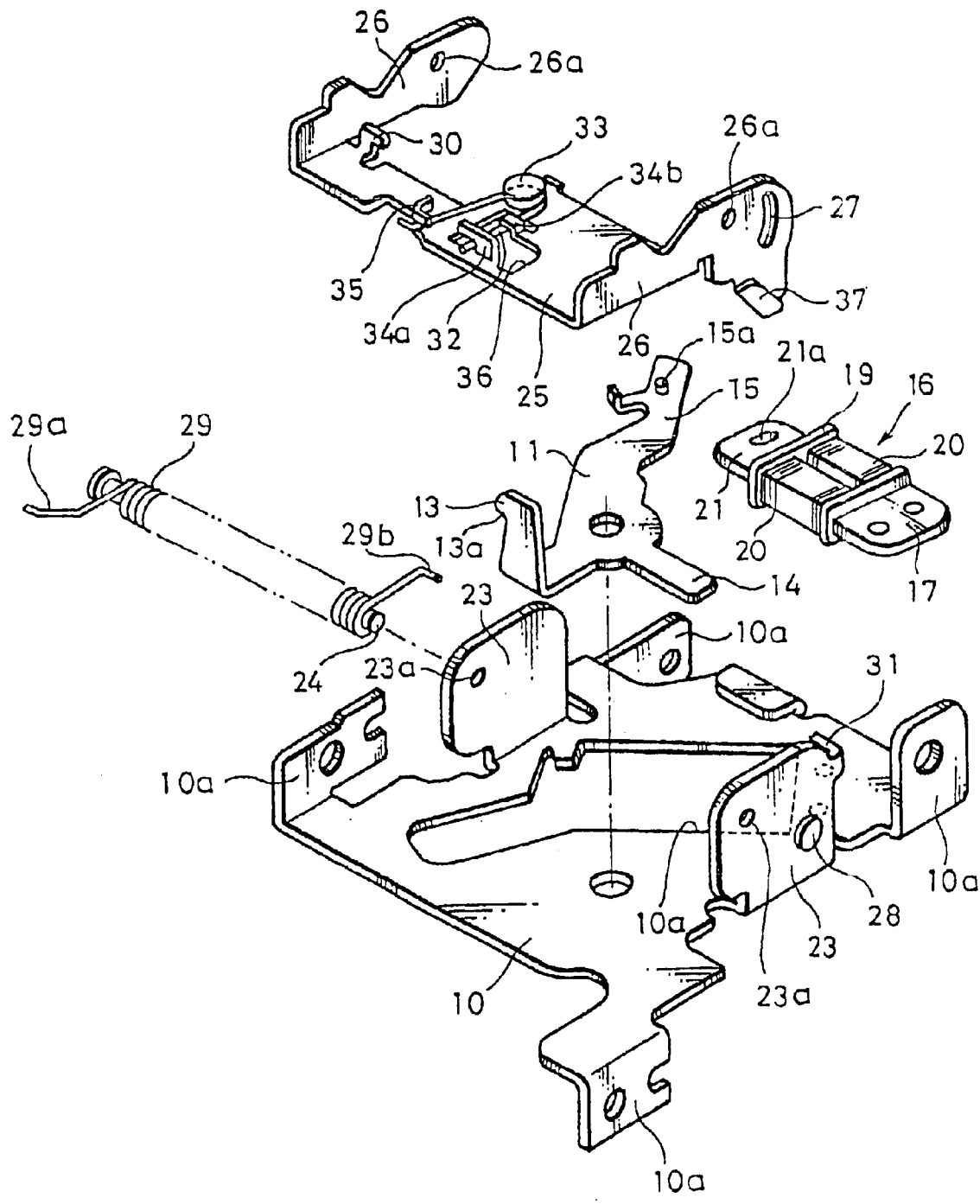
FIG. 12 is a perspective view of the main parts of the pop-up mechanism in a disassembled condition.

FIG. 1 is an outline perspective view of a video camera apparatus in a condition that a flashing apparatus (hereinafter referred to as a strobo apparatus) is housed in a housing position. FIG. 2 is an outline perspective view of the video camera apparatus in a condition that the strobo apparatus is sprung up to a pop-up position. FIG. 3 is a cross sectional view of the strobo apparatus in a condition that it is housed in the video camera apparatus. FIG. 4 is a cross sectional view of the strobo apparatus in a condition that it has popped up from the video camera apparatus. FIG. S is a perspective view of the strobo apparatus in the same condition that it has popped up from the video camera apparatus. FIG. 6 is a plan view of the pop-up mechanism in a housed condition. FIG. 7 is a perspective view of the pop-up mechanism in the same housed condition. FIG. 8 is a plan view of the pop-up mechanism just before the pop-up. FIG. 9 is a perspective view of the pop-up mechanism in a popped up condition. FIG. 10 is a side view of the pop-up mechanism in the same popped up condition. FIG. 11 is a front view of the pop-up mechanism in the same popped up condition. FIG. 12 is a perspective view of the main parts of the pop-up mechanism in a disassembled condition.

Firstly, functions of the video camera apparatus are described. The front side of a video camera main unit 1 is provided with a photographic lens 2. An image of a subject coming in from this photographic lens 2 through a group of optical lenses is converted to picture signals by a CCD (solid imaging device), and recorded on a magnetic tape with sound signals collected by a microphone 3 separately provided on the front side of the video camera main unit 1. In addition, a still picture taken during shooting is recorded in a stick-shaped recording medium.

A view finder 4 with an eyepiece through which an image of a subject can be viewed is provided on the rear face side of an upper part of the video camera main unit 1. One side of the video camera main unit 1 is externally attached with a liquid crystal display panel 5 that is rotatably connected using a hinge and can be freely positioned vertically or reversely. Shooting can be performed while watching the image of the subject displayed on this liquid crystal display panel 5. In addition, a still picture or a reproduced image can be displayed on this liquid crystal display panel 5.

A photo button 6 is provided for taking a still picture. A zoom lever 7 and a mode selector lever 8 are included to select from Video, PowerOff, Camera and Memory. A record button is arranged on the front side of this mode selector lever 8 but is not illustrated.

A strobo apparatus 9 is provided on the front side of an upper part of the video camera apparatus. When the amount of light admitted to the subject is sufficient at the time of taking a still picture, the strobo apparatus 9 is housed in a depression 1a of the video camera main unit 1 (FIG. 2). When the strobo apparatus 9 is in an unused condition, and the amount of light admitted to the subject is insufficient, the strobo apparatus 9 is sprung up from the video camera main unit 1 to the pop-up position to come into a used condition.

Now, the pop-up mechanism of the strobo apparatus 9 is described in detail.

As best seen in FIG. 3, a base frame 10 oft he pop-up mechanism, and a plurality of attachments 10a formed by partly bending the base frame 10, are fastened on one side of the video camera main unit 1 with screws. A working member 11 is installed on the base frame 10 so as to be rotatable around a fulcrum 12. More specifically, the working member 11 is provided with a hooking piece 13 formed by bending and erecting a part of the working member 11 and has a hooking slope 13a standing, for example, at an elevation angle, a return piece 14 horizontally extending from the working member 11 in a direction perpendicular to the hooking piece 13, and a lever 15 separately extending from the working member 11. (See FIG. 6)

Further a plunger mechanism 16 to be linked with the lever 15 of the above-mentioned working member 11 is mounted on the base frame 10. More specifically, a mounting section 17 of the plunger mechanism 16 is fastened on the base frame 10 with screws 17a, and a pair of magnets 18 are supported in parallel with the surface of the mounting section 17. Bobbins 19 created by externally winding coil 20 around both magnets 18 are supported in a condition of being inserted into the mounting section 17. U-shaped steel pieces 22 of a plunger movable section 21 are inserted from an opening side of the bobbins 19, and tip ends of the steel pieces 22 are magnetically attracted toward an end face of the magnets 18. A hole 21a provided in the plunger movable section 21 is engaged with a projection 15a provided in the lever 15 of the above-mentioned working member 11. In addition, the plunger mechanism 16 excluding the mounting section 17 is located at a punched hole 10a provided in the base frame 10.

In the plunger mechanism 16 thus configured, when the coils 20 are not energized, the steel pieces 22 of the plunger movable section 21 are attracted by a magnetic attracting force generated by the magnets 18 to pull the lever 15 of the working member 11. On the other hand, when the coils 20 are energized, a magnetic force of the magnets 18 is inactivated by an electromagnetic force generated by the coils 20. Thus, the lever 15 of the working member 11 is released from a traction force by the plunger movable section 21.

On the other hand, the above-mentioned base frame 10 is provided with a pair of right and left bearing plates 23 vertically formed by partly bending and erecting the base frame 10, and shaft holes 23a formed in these bearing plates 23 support a shaft 24. Shaft holes 26a of side plates 26 formed by bending at right and left sides of a movable frame 25 also support this shaft 24 to keep the movable frame 25 rotatable. In the movable frame 25, an arc-shaped guide hole 27, which is concentric with the shaft hole 26a of one of two side plates 26, is engaged with guide pins 28 attached to one of two side plates 23 of the base frame 10. Thus rotation of the movable frame 25 is limited to a range between a horizontal position in parallel with the surface of the base frame 10 and a position at an elevation angle of, for example, 35°.

The above-mentioned shaft 24 is provided with a coil spring 29. One spring end 29a of the coil spring 29 is engaged with a spring hooking section 30 formed by partly cutting and erecting the movable frame 25, and another spring end 29b is engaged with a spring hooking section 31 formed in one of two bearing plates 23 of the base frame 10. In other words, the movable frame 25 is urged so as to be held in an elevation angle position by a spring force of the coil spring 29.

Further in the movable frame 25, a wire 32 bent to form a V-letter shape has its bending portion supported by a supporting pin 33. One end of the wire 32 is supported by two retaining pieces 34a and 34b formed by partly bending and erecting the movable frame 25, and another end is hooked to a clasp 35. A window aperture is opened at a portion of the movable frame 25, to which a portion of the wire 32 that crosses between the retaining pieces 34a and 34b corresponds. In addition, item 37 is a recovery piece formed so as to protrude by extending from one of the side plates 26 of the movable frame 25, and this recovery piece 37 corresponds to the return piece 14 of the above-mentioned working member 11.

The afore-mentioned strobo apparatus 9 is mounted on the above-mentioned movable frame 25. A lower cover 38 forming one of plural sheaths of the strobo apparatus 9 is fastened on a rear face of the movable frame 25 with not illustrated screws, and a through-hole 39 is formed in a part of the lower cover 38 so as to communicate with the window opening 36 formed in the movable frame 25. An upper cover 40 forming another sheath is installed to this lower cover 38.

In a space confined by both the upper and lower covers 38 and 40, a luminous tube 43 equipped with a reflector 42 is installed so as to be supported by a strobo frame 41. A diffusion lens 44 is attached to the front side of this luminous tube 43 so as to be supported by both the upper and lower covers 38 and 40. In addition, item 45 is a trigger coil to allow the luminous tube 43 to emit strobo light.

FIG. 3 shows how the strobo apparatus 9 is housed, which is configured according to the above descriptions. In this configuration, when the strobo apparatus 9 is manually rotated downward from the popped up condition around the shaft 24 as a fulcrum for rotation, as shown in FIG. 4, the hooking piece 13 rising from the working member 11 penetrates through the through-hole 39 of the lower cover 38 and the window opening 36 of the movable frame 25. Then, the hooking piece 13 deflects the wire 32 inward to engage with the wire 32 so that the strobo apparatus 9 is locked in the housing position.

Figure 13:
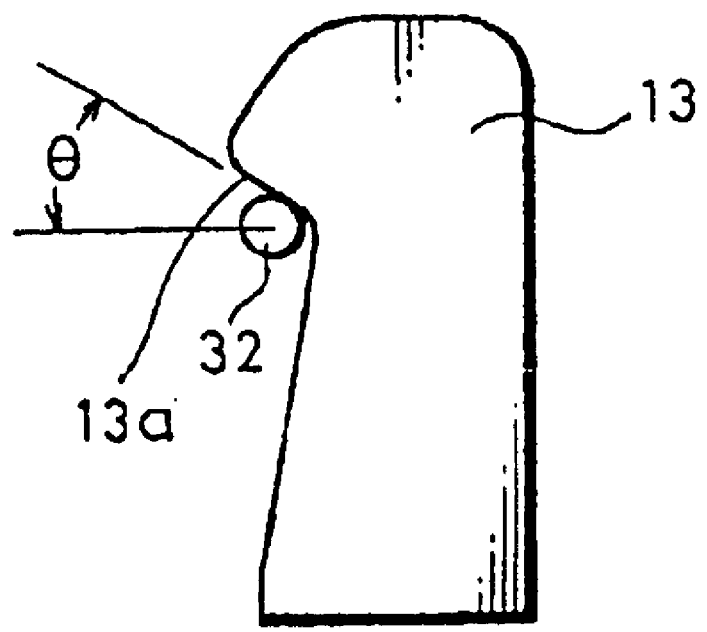
FIG. 13 is a front view of a hooking piece and a wire in an engaged condition.

In a condition that the strobo apparatus 9 is locked in the housing position, the plunger mechanism 16 is in a deenergized state. As the steel pieces 22 of the plunger movable section 21 are attracted by a magnetic force of the magnets 18, the working member.11 is withdrawn by the plunger movable section 21, and the hooking piece 13 is urged toward a direction to be engaged with the wire 32 as shown in FIG. 6. In other words, the housed condition of the strobo apparatus 9 is maintained since the magnetic attracting force of the plunger movable section 21 is larger than a spring force of the coil spring 29 that urges the strobo apparatus 9 in a pop-up direction. At this time, in the hooking piece 13 engaged with the wire 32, an angle of the hooking slope 13a is set at, for example, around 30 so as to be larger than an angle of friction between the hooking piece 13 and the wire 32, as shown in FIG. 13.

Now mechanical movement in which the strobo apparatus 9 is sprung up to the pop-up position is described.

Application of pulse signals to the coil 20 of the plunger mechanism 16 causes the magnetic force of the magnets 18 of the plunger mechanism 16 to drop to zero to release the steel piece 22 from magnetic attraction, and the movable frame 25 is sprung up by the spring force of the coil spring 29. In other words, the hooking piece 13 engaged with the wire 32 by the sprung-up action of the movable frame 25 is pushed back by an upward action of the wire 32 while sliding on the hooking slope 13a. Thus the hooking piece 13 is disengaged from the wire 32, the strobo apparatus 9 is unlocked, and simultaneously the strobo apparatus 9 pops up together with the movable frame 25.

FIG. 8 shows movement of the working member 11 just after the time when the hooking piece 13 is disengaged from the wire 32 of the movable frame 25 and the strobo apparatus 9 is unlocked. In other words, as the working member 11 rotates counterclockwise around the fulcrum 12, the steel piece 22 is pulled out from the bobbin 19 together with the plunger movable section 21 of the plunger mechanism 16, and the return piece 14 moves backward. When the movable frame 25 is sprung up to the pop-up position, the return piece 14 is pushed out by the recovery piece 37 of the movable frame 25. Therefore, the working member 11 is rotated to return to the original position. Further, as shown in FIG. 6, the plunger movable section 21 moves backward, the steel piece 22 is magnetically attracted by the magnets 18, and simultaneously the hooking piece 13 returns to a position where the hooking piece 13 is locked with the wire 32.

Movements of the strobo apparatus relating to an operation to acquire a still picture in the video camera apparatus is described.

Figure 14:
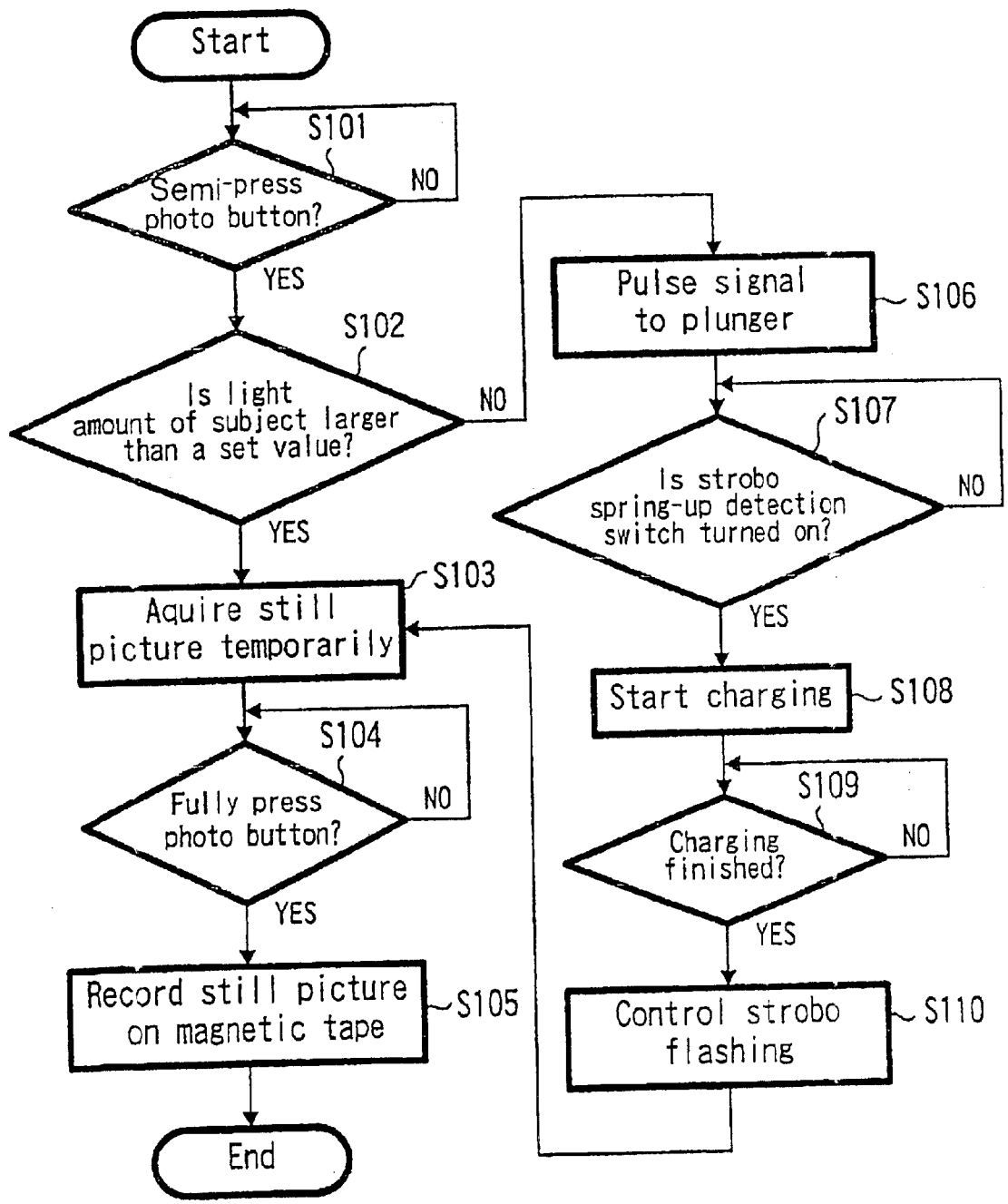
FIG. 14 is a flow chart of an operation to acquire a still picture in a camera mode.

Firstly, the movements of the strobo apparatus relating to an operation to acquire a still picture in a camera mode of the video camera apparatus are described by referring to a flow chart shown in FIG. 14.

In order to acquire a still picture during video shooting, first, the photo button 6 is semi-pressed (Step S101). When the semi-pressing of the photo button 6 is identified, the photometric means examines whether or not the amount of light admitted to a subject is larger than a set value (Step S102). If the photometric means judges that the amount of light admitted to the subject is larger than the set value, the still picture is temporarily acquired without pop-up movement of the strobo apparatus 9 (Step S103). Then, by full-pressing the photo button 6 (Step S104), the still picture is recorded on a magnetic tape (Step S105).

On the other hand, when the amount of light admitted to the subject is judged to be smaller than the set value in the above-mentioned step S102, Step S106 is performed to apply a plunger pulse signal (for example, 1/60 sec) to the coil 20 of the plunger mechanism 16. Then, in the plunger mechanism 16, a magnetic force of the magnets 18 drops to zero to release the steel piece 22 from attraction. Therefore, the strobo apparatus 9 is sprung up to proceed to the pop-up by the spring force of the coil spring 29.

After the pop-up movement of the strobo apparatus 9, whether or not a strobo spring-up detection switch is turned on is judged (Step S107). When the strobo spring-up detection switch is recognized to have been turned on, charging of the strobo apparatus 9 is started (Step S108), and the charging is finished, for example, in 0.5 sec (Step S109). When it is judged that the charging has been finished, strobo flashing is controlled by a strobo flashing trigger pulse signal in synchronization with the completion of charging (Step S110), and the above-mentioned temporary action of capturing the still picture is performed (Step S103). Then, by full-pressing the photo button 6 (Step S104), the still picture is recorded on a magnetic tape (Step S104).

Figure 15:
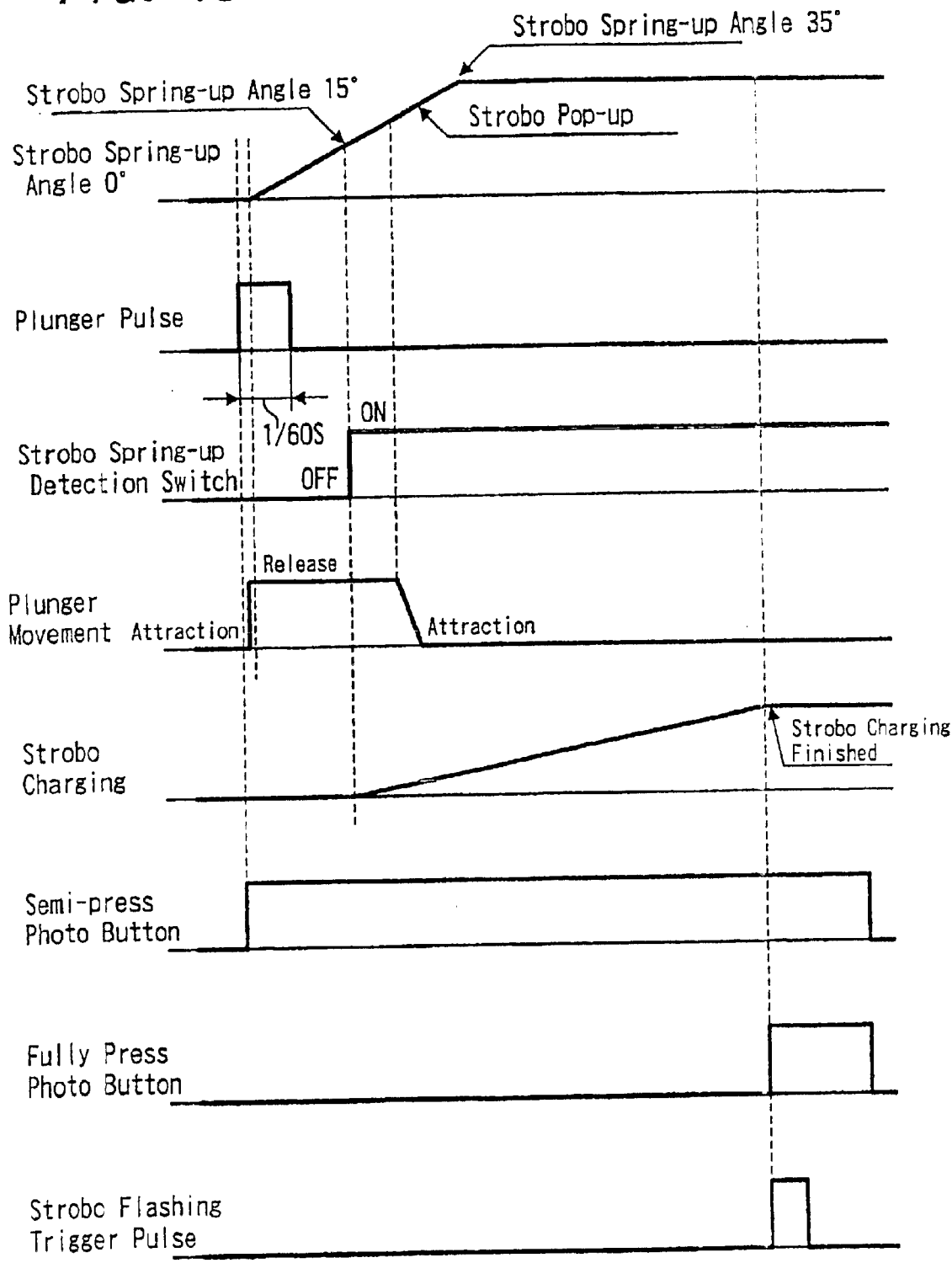
FIG. 15 is a timing chart in the same camera mode.

FIG. 15 shows a timing chart when the strobo apparatus 9 is popped up. A pop-up elevation angle of the strobo apparatus 9 is, for example, 35 and the detection switch of the strobo on/off is turned on at timing when the elevation angle reaches, for example, 15 during the pop-up movement of the strobo apparatus 9. As the plunger pulse signal takes 1/60 sec, the plunger mechanism 16 is deenergized again to allow the steel piece 22 to be attracted by the magnetic force of the magnets 18 almost at the same time when the pop-up movement of the strobo apparatus 9 is finished.

Figure 16:
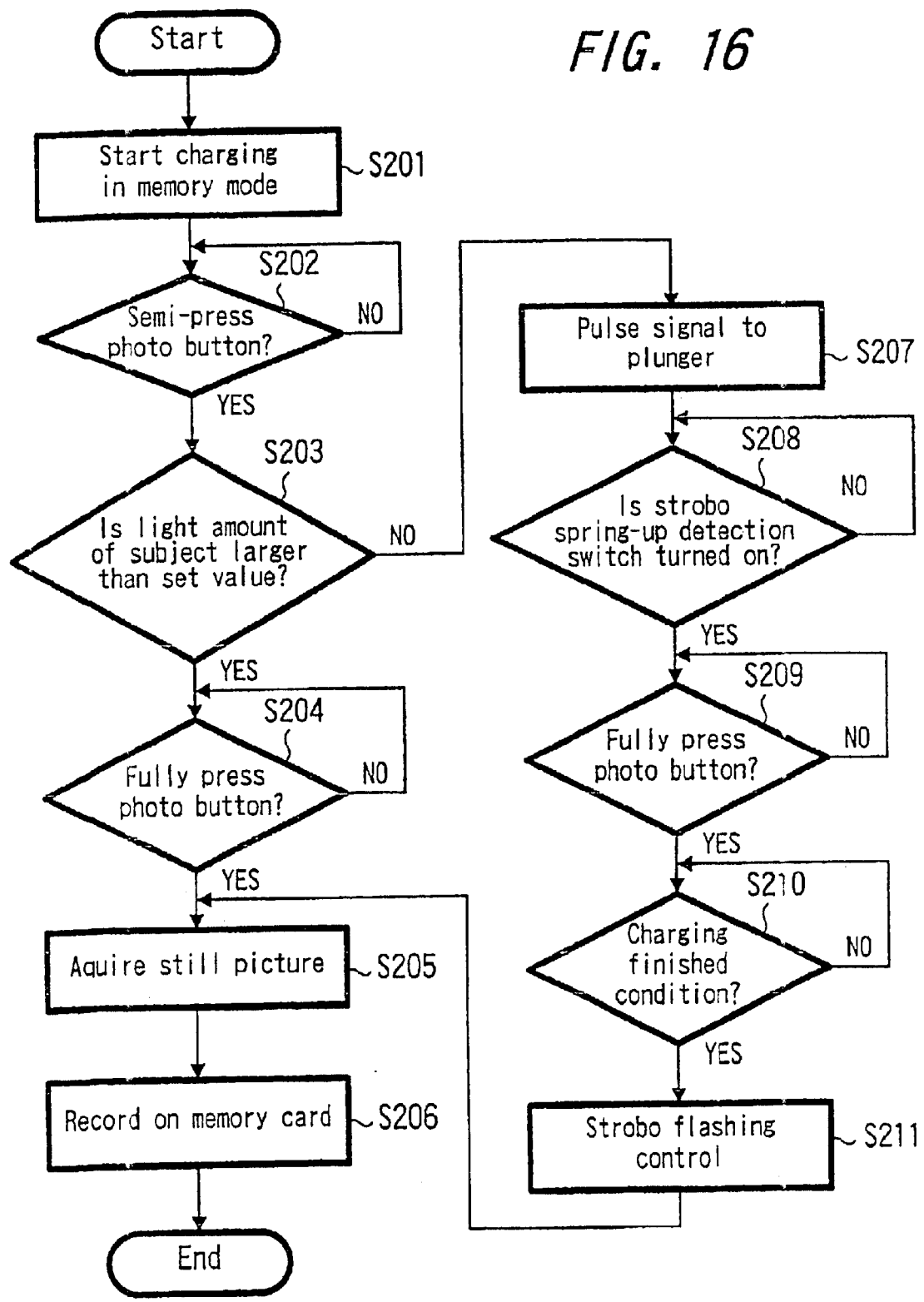
FIG. 16 is a flow chart of the operation to acquire the still picture in a memory mode.

Secondly, the movements of the strobo apparatus relating to operation to acquire a still picture in a memory mode of the video camera apparatus are described referring to a flow chart shown in FIG. 16.

In order to acquire a still picture in the memory mode, charging of the strobo apparatus 9 is started in a set memory mode (Step S201). Firstly, the photo button 6 is semi-pressed (Step S202). When the semi-pressing of the photo button 6 is identified, the photometric means examines whether or not the amount of light admitted to a subject is larger than a set value (Step S203). If the photometric means judges the amount of light admitted to the subject is larger than the set value, the photo button 6 is fully pressed without the pop-up movement of the strobo apparatus 9 (Step S204). When the full-pressing of the photo button 6 is recognized, the still picture is acquired (Step S205), and then the still picture is recorded on a memory card (Step S206).

On the other hand, when the amount of light admitted to the subject is judged to be smaller than the set value in the above-mentioned step S203, step S207 is performed to apply a plunger pulse signal (for example, 1/60 sec) to the coil 20 of the plunger mechanism 16. Then, in the plunger mechanism 16, a magnetic force of the magnets 18 is inactivated to release the steel piece from attraction, and the strobo apparatus 9 is sprung up by the spring force of the coil spring 29 to thereby proceed to the pop-up action.

After the pop-up movement of the strobo apparatus 9, whether or not a strobo spring-up detection switch (not illustrated) is turned on is examined (Step S208). After the strobo spring-up detection switch is turned on, the photo button 6 is fully pressed (Step S209). As the charging of the strobo apparatus 9 is already finished at this time (Step S210), strobo flashing is controlled by a strobo flashing trigger pulse signal (Step S211), and the above-mentioned action of capturing the still picture is performed (Step S205). Then the still picture is recorded on a memory card (Step S206).

Figure 17:
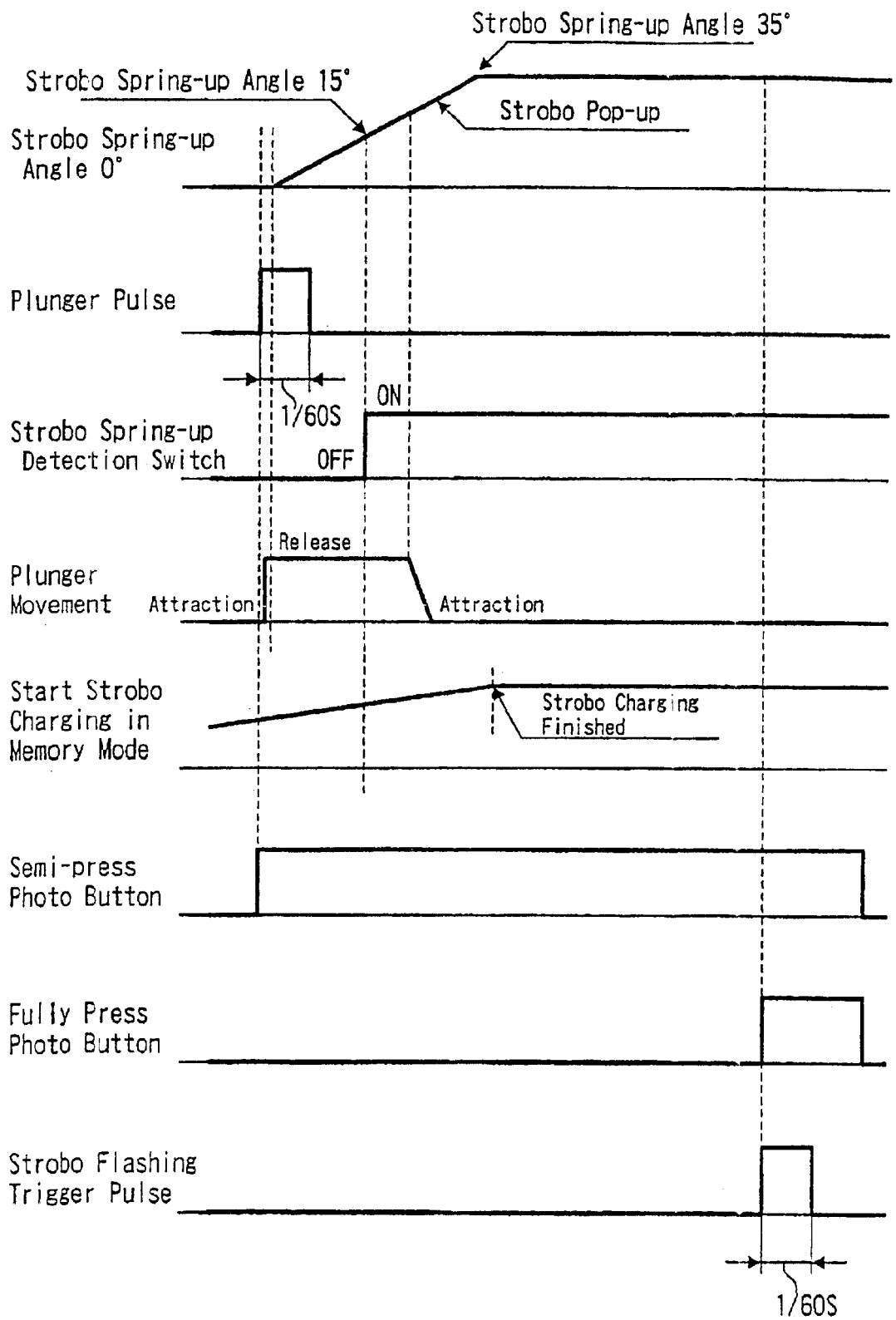
FIG. 17 is a timing chart in the same memory mode.

FIG. 17 shows a timing chart when the strobo apparatus 9 is popped up. This timing chart is identical to the above-mentioned one for the camera mode movement except that charging of the strobo is started by the memory mode setting and the photo button 6 is fully pressed after completion of the charging of the strobo.

As mentioned above, the pop-up mechanism of the strobo apparatus according to the present invention makes it possible to configure the pop-up mechanism in a small space without using a conventional motor or a gear train. In addition, as it is possible to greatly reduce the number of parts, a compact and light-weight apparatus can be manufactured at a low cost.

Installation of the strobo apparatus equipped with the pop-up mechanism on a camera apparatus makes it possible to save space for the strobo apparatus in the camera apparatus, increases the degree of freedom of the strobo apparatus, and improves design performance of the camera apparatus.

In this embodiment, the plunger mechanism 16 is configured so that the magnetic force drops to zero by applying a plunger pulse signal to the plunger mechanism 16 in the housed position of the strobo apparatus 9. However, it is possible to configure the mechanism so that the plunger movable section 21 is pulled out when the plunger pulse signal is applied.

Although the case in which the strobo apparatus equipped with the pop-up mechanism is mounted on a video camera apparatus is described above, the present invention is widely applicable to the strobo apparatus for apparatus such as a still camera apparatus and a digital camera apparatus other than the video camera apparatus.

As described above, the pop-up mechanism for the flashing apparatus according to the present invention comprises a flashing apparatus supported so that the flashing apparatus is movable between the pop-up position and the housing position, a spring means which urges the flashing apparatus to the pop-up position, a working member having the engaging means to hold the flashing apparatus in the housing position, and a plunger that is linked with the working member and of which a magnetic attracting force is inactivated when the plunger is energized, wherein the pop-up mechanism can be configured in a small space, and the number of parts can be greatly reduced. Therefore, the present invention has the effects that the compact and light-weight camera apparatus can be manufactured at a low cost.

Further, as the camera apparatus equipped with the pop-up mechanism for the flashing apparatus according to the present invention comprises a photo button, a photometric means which detects brightness of a subject by a semi-pressing operation of the photo button, and a flashing apparatus that is designed so as to be sprung up to the pop-up position when the amount of light admitted to the subject detected by the photometric means is equal to or less than a set value. Therefore, the present invention has effects such that the space for the flashing apparatus of the camera apparatus can be saved, the degree of freedom of the flashing apparatus increases, and the design performance of the camera apparatus can be improved.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A pop-up mechanism for a flashing apparatus comprising:
   a photo button having a first press position and a full-press position, said first press position being less than said full-press position;
   a flashing apparatus which is supported so as to be movable between a pop-up position and a housing position;
   a spring means which urges said flashing apparatus to said pop-up position;
   a working member having an engaging means which holds said flashing apparatus in said housing position;
   photometric means responsive to said first press position of said photo button to examine whether or not an amount of light admitted to a subject is larger than a set value so that, when larger, a picture is temporarily acquired while said flashing apparatus remains in said housing position; and
   a plunger, responsive to said photo button and said photometric means, which is linked to said working member and of which a magnetic attracting force is inactivated when energized, wherein in a condition that said flashing apparatus is housed, said working member is attracted by a magnetic force generated in said plunger resisting a spring force of said spring means, said flashing apparatus is held in said housing position by said engaging means, said engaging means is moved backward by a spring force of said spring means by energizing said plunger to inactivate the magnetic attracting force, and said flashing apparatus is sprung up to said pop-up position when the amount of light admitted to the subject is judged to be smaller than the set value to energize said plunger.

2. The pop-up mechanism for a flashing apparatus according to claim 1, wherein:

said working member is rotated interlocking with a action in which said flashing apparatus is sprung up to said pop-up position, and said engaging means is returned to said holding position of said flashing apparatus by said magnetic attracting force generated in said plunger.

3. The pop-up mechanism for a flashing apparatus according to claim 1, wherein:

when said flashing apparatus is in said pop-up position, means responsive to a spring-up detection switch for initiating a charging of said flashing apparatus, and for judging when said charging is finished, controlling flashing by a trigger pulse signal in synchronization with the completion of said charging, and performing an action whereby a picture is temporarily acquired.

4. The pop-up mechanism for a flashing apparatus according to claim 1, wherein said first press position is a semi-press position.

5. The pop-up mechanism for a flashing apparatus according to claim 1, wherein said temporarily acquired picture is recorded onto a magnetic tape by pressing said photo button to said full-press.

6. The pop-up mechanism for a flashing apparatus according to claim 3, wherein said temporarily acquired picture is recorded onto a magnetic tape by pressing said photo button to said full-press position.

7. The pop-up mechanism for a flashing apparatus according to claim 3, wherein said detection switch is responsive to an angle of elevation of said flashing apparatus.

8. The pop-up mechanism for a flashing apparatus according to claim 1, further including means for recording a picture on a memory card, wherein a charging of said flashing apparatus is responsive to a set memory mode.

9. The pop-up mechanism for a flashing apparatus according to claim 8, wherein:

when said photometric means determines the amount of light admitted to the subject is larger than the set value, said photo button is pressed to said full-press position such that a picture is recorded on said memory card while said flashing apparatus remains in said housing position.

10. The pop-up mechanism for a flashing apparatus according to claim 9, wherein:

when said flashing apparatus is in said pop-up position, means responsive to a spring-up detection switch for judging when said photo button has been pressed to said full-press position, and for judging when said charging of said flashing apparatus is finished, controlling flashing by a trigger pulse signal in synchronization with a pressing of said photo button to said full-press position, and performing an action whereby a picture is acquired and then recorded on said memory card.

* * * * *

UNITED STATES PATENT AND TRADEMARK OFFICE
CERTIFICATE OF CORRECTION

PATENT NO. : 6,850,703 B2
DATED : February 1, 2005
INVENTOR(S) : Yoshiya Miyazaki and Yoichi Miyajima It is certified that error appears in the above-identified patent and that said Letters Patent is hereby corrected as shown below:

Column 9,
Line 1, "a action" should read -- an action --.
Line 21, "full-press" should read -- full-press position --.

Signed and Sealed this

Twelfth Day of July, 2005

JON W. DUDAS
*Director of the United States Patent and Trademark Office*